Figure 31:
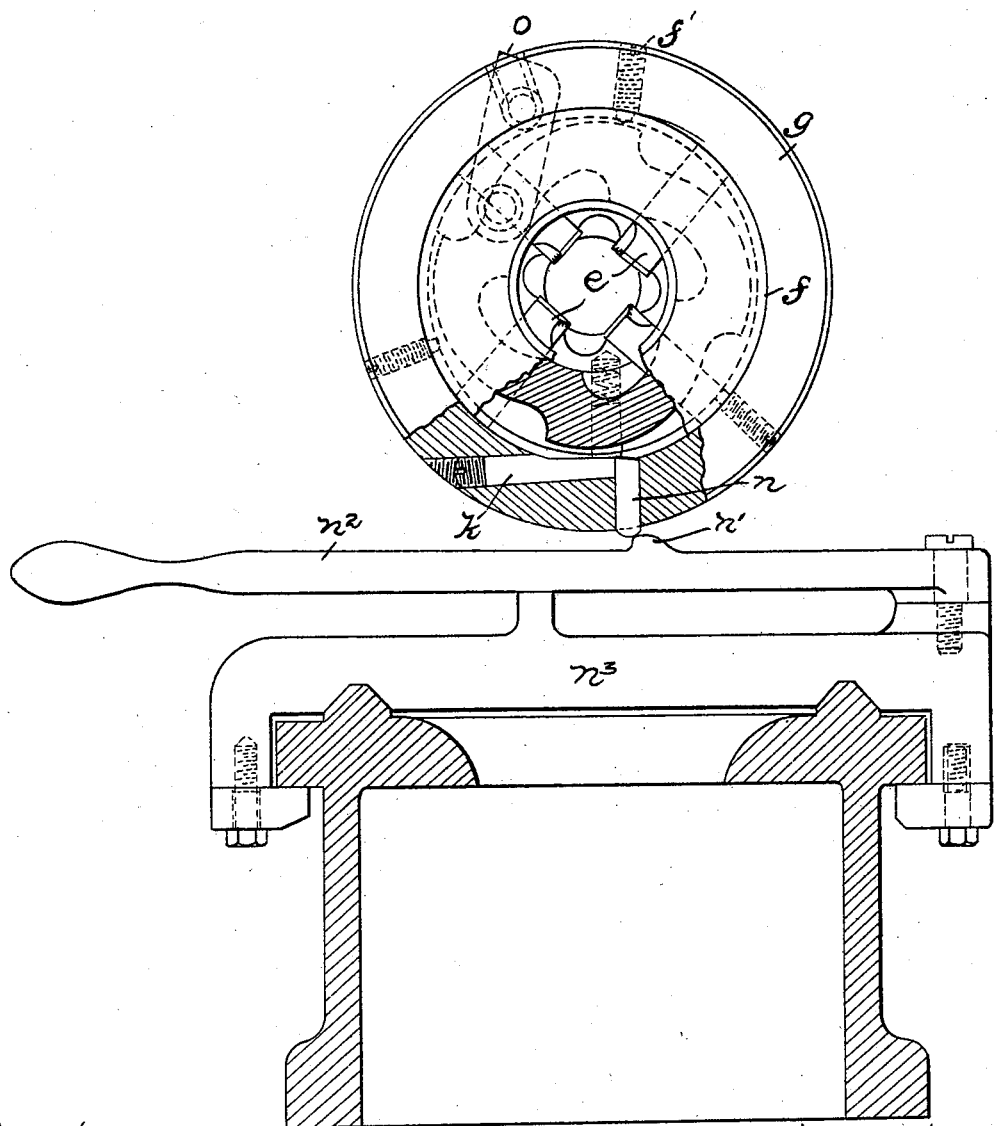

No. 614,949. Patented Nov. 29, 1898.
J. HARTNESS.
SCREW CUTTING DIE.
(Application filed Feb. 7, 1898.)
(No Model.) 5 Sheets—Sheet 1.
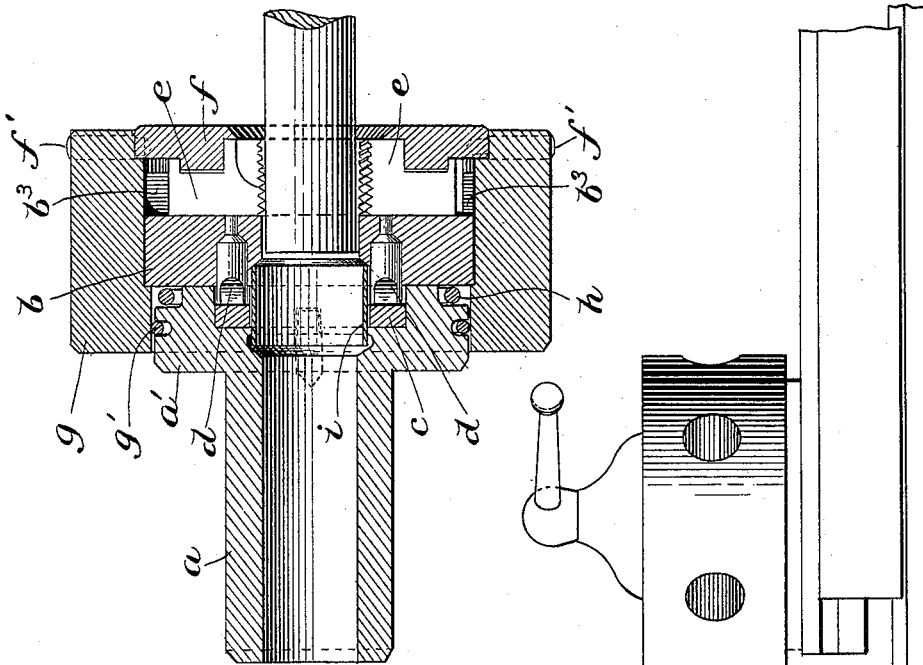
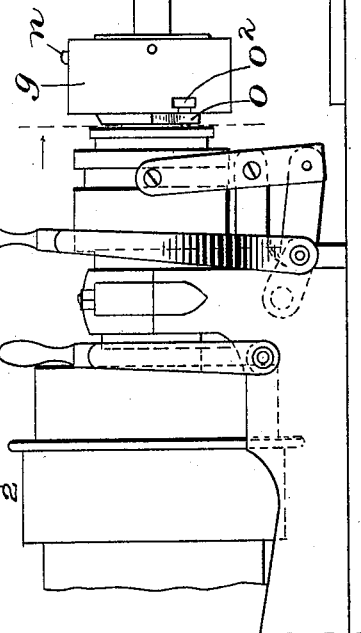
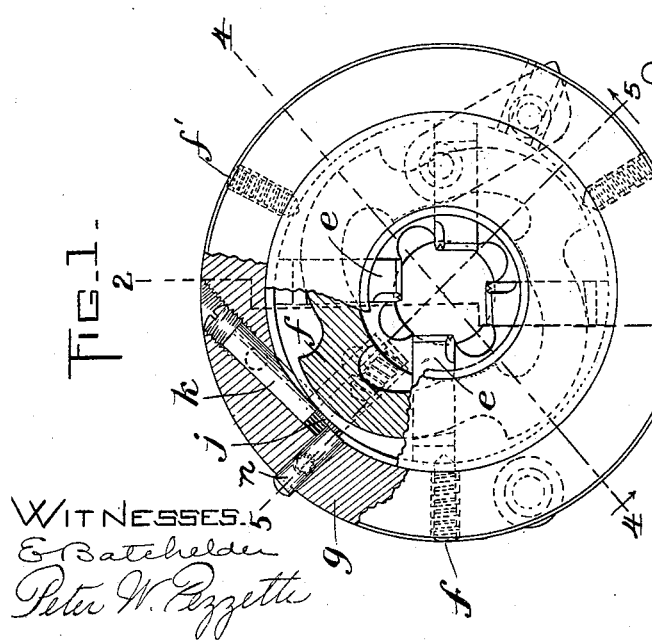
WITNESSES:
E. Batchelder
Peter W. Pezzetti
INVENTOR:
James Hartness
by Wright Brown & Quinby
Attys.
THE NORRIS PETERS CO., PHOTO-LITHO., WASHINGTON, D. C.

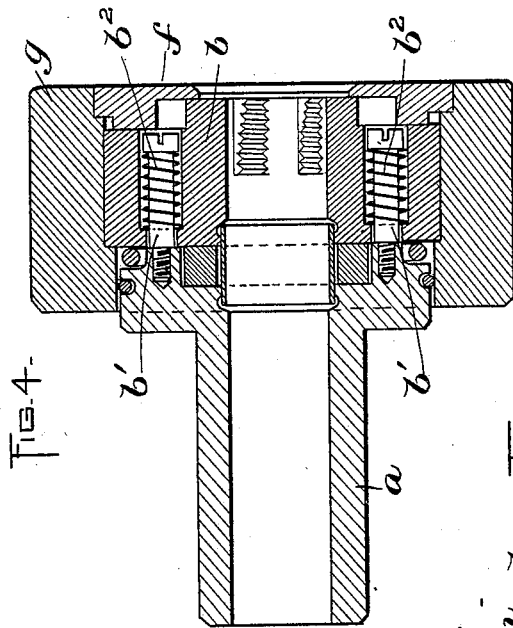
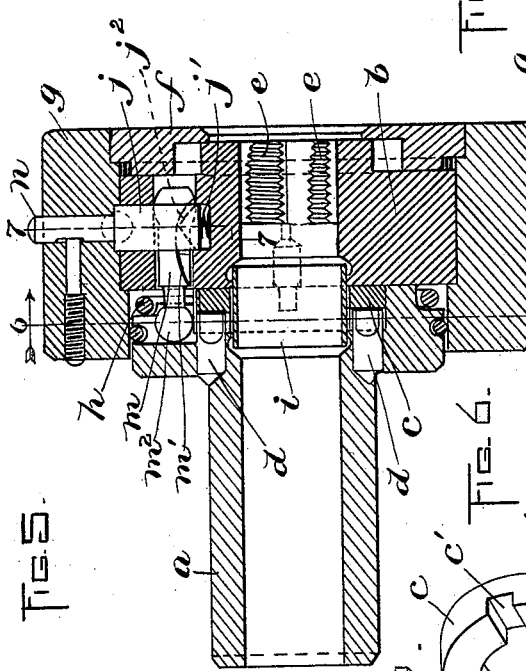
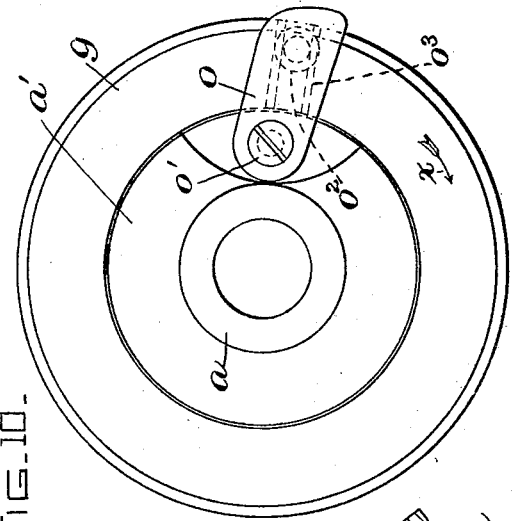
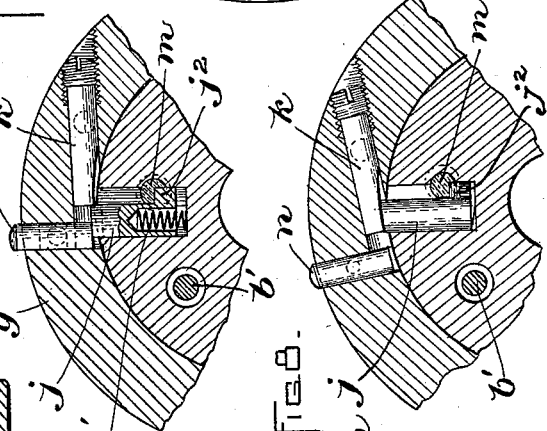
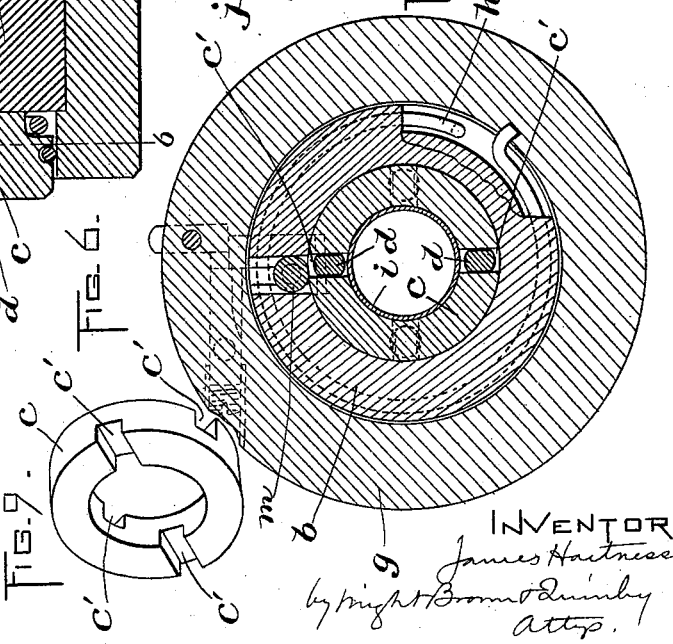

No. 614,949. Patented Nov. 29, 1898.
J. HARTNESS.
SCREW CUTTING DIE.
(Application filed Feb. 7, 1898.)
(No Model.) 5 Sheets—Sheet 3.
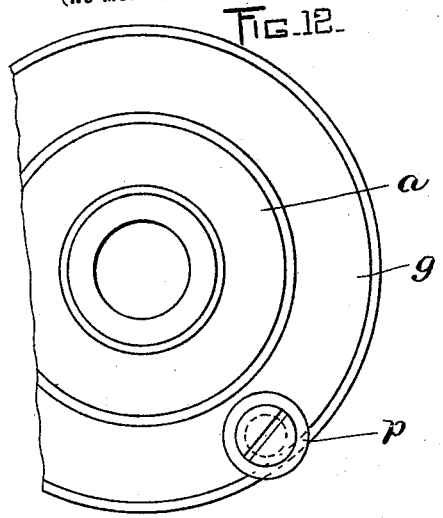
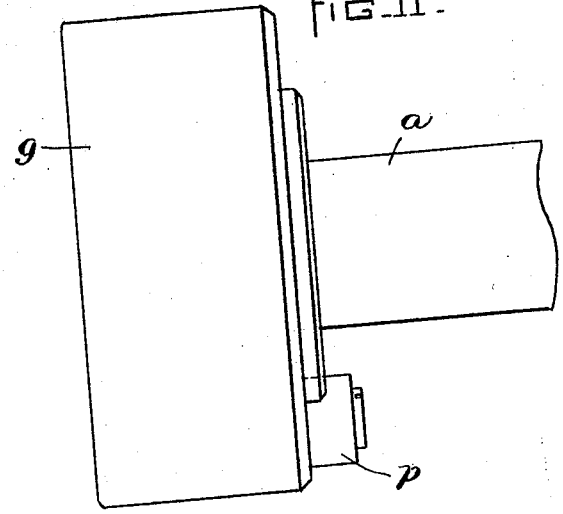
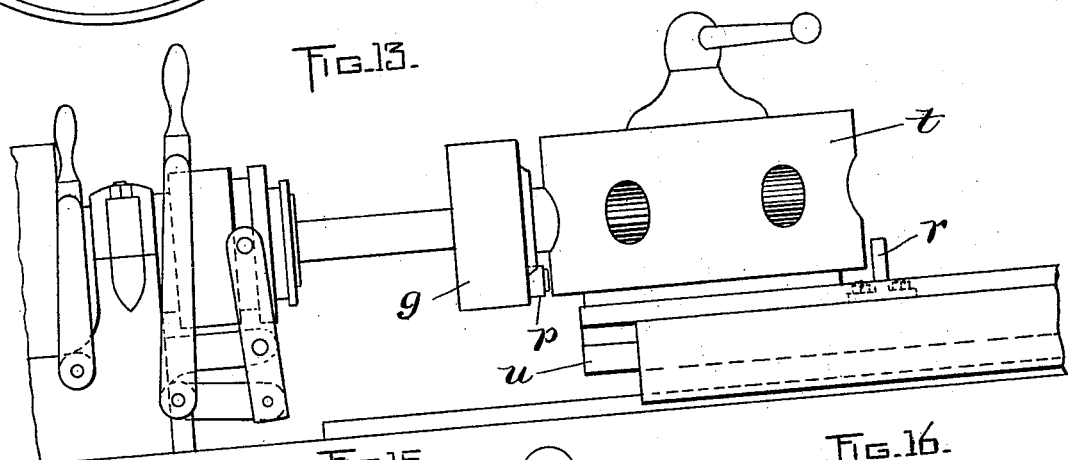
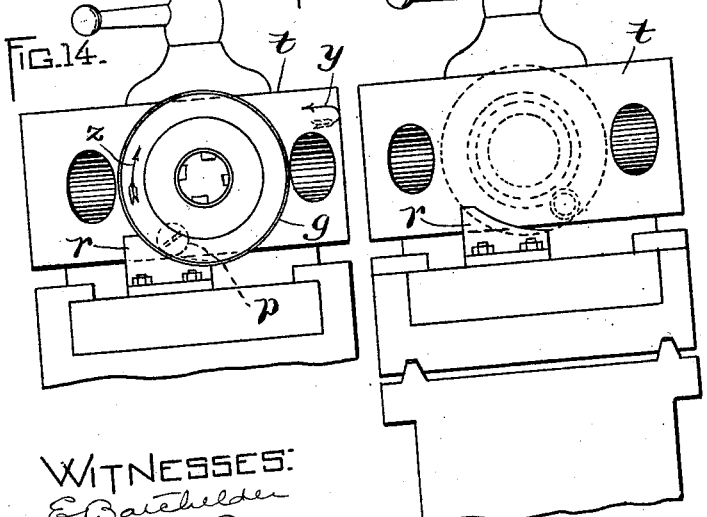
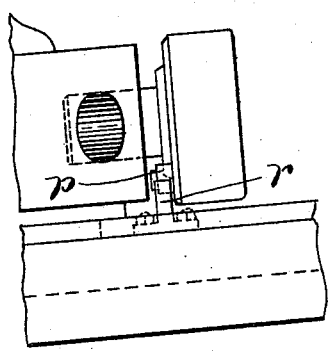
WITNESSES:
INVENTOR:

No. 614,949. Patented Nov. 29, 1898.
J. HARTNESS.
SCREW CUTTING DIE.
(Application filed Feb. 7, 1898.)
(No Model.) 5 Sheets—Sheet 4.
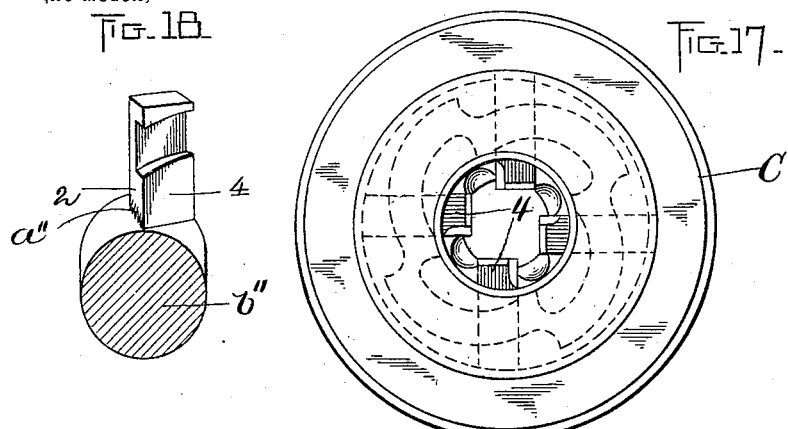

No. 614,949. Patented Nov. 29, 1898.
J. HARTNESS.
SCREW CUTTING DIE.
(Application filed Feb. 7, 1898.)
(No Model.) 5 Sheets—Sheet 5.

WITNESSES: INVENTOR:

UNITED STATES PATENT OFFICE.

JAMES HARTNESS, OF SPRINGFIELD, VERMONT.

SCREW-CUTTING DIE.

SPECIFICATION forming part of Letters Patent No. 614,949, dated November 29, 1898.

Application filed February 7, 1898. Serial No. 669,385. (No model.)

*To all whom it may concern:*

Be it known that I, JAMES HARTNESS, of Springfield, in the county of Windsor and State of Vermont, have invented certain new and useful Improvements in Screw-Cutting Dies, of which the following is a specification.

The present invention relates to screw-cutting dies of the type shown in my former patent, No. 565,746, granted August 11, 1896. In that patent a form of chaser-cutter is disclosed peculiar for the formation of its acting face or end, the teeth whereof are so formed that a limited number at the front part have their ends or points in cutting contact with the work, the remainder of the teeth having their edges in contact with the work back of their ends or points, with the result that the work is embraced as by a nut and uniformity of pitch is insured in the thread which is cut. In the present case I propose to accomplish substantially the same result, but not by a peculiarity in the formation of the acting face, as before, so much as by a peculiarity in the relation of the front or cutting side of the chaser-cutter to the axis of the die. This will be more specifically described hereinafter in connection with the accompanying drawings, which illustrate several different forms of embodiment of the idea above expressed.

The present invention has further in view the provision of an improved form of coupling between the main holder of the die and the die-body, whereby these parts are rotatively interlocked, while provision is made for relative longitudinal and slight angular play.

The invention also provides improved detent mechanism for holding the die closed and means for automatically tripping said mechanism by reason of rotary movement of the die, as well as by relative longitudinal movement between the main holder and the die-body.

A still further object of the invention is to provide for automatically closing the die in conjunction with and by reason of either rotary or bodily movement of the latter.

The invention aims also to generally improve the construction of the die, rendering it more compact, more durable, and more serviceable than any heretofore known.

To the above-stated ends the invention consists in a number of novel features of construction and combinations of parts, all of which are the subject of detailed description hereinafter and illustration in the accompanying drawings, and the essential features of which are brought out in the appended claims.

Of the drawings, Figure 1 represents in front elevation a die constructed in accordance with my invention, the cam and cam-holder being partially broken away and sectionalized to disclose interior constructions. Fig. 2 represents the die in longitudinal section on line 2 2 of Fig. 1. Fig. 3 represents a machine or lathe in side elevation, in which my improved die appears mounted upon the spindle and adapted to be rotated thereby. Figs. 4 and 5 represent the die in longitudinal section on lines 4 4 and 5 5 of Fig. 1. Fig. 6 represents the die in cross-section on line 6 6 of Fig. 5, viewed in the direction of the arrow crossing said line, and a portion of a flange of the main holder being broken away. Figs. 7 and 8 are fragmentary sectional views on line 7 7 of Fig. 5 and illustrate different relative positions of the detent devices and releasing means. Fig. 9 represents in perspective a coupling ring or collar, which appears in section in Figs. 2, 4, and 5. Fig. 10 represents the die in rear elevation with one form of automatic closing means. Fig. 11 represents the die in side elevation with a different form of closing means. Fig. 12 represents a portion of the same in rear elevation. Fig. 13 represents in side elevation a machine or lathe wherein my improved die appears mounted on a turret. Figs. 14 and 15 represent this machine in end elevation, viewed from the right of Fig. 13, and illustrating different relative positions of parts which operate to automatically close the die. Fig. 16 represents these parts in side elevation, as viewed from the left of Fig. 14. Fig. 17 represents the die in front elevation. Fig. 18 represents one of the chaser-cutters in perspective in connection with a piece of work. Fig. 19 represents the same parts in top plan. Fig. 20 represents the chaser-cutter in bottom plan with a dotted-line illustration of the work. Figs. 21 and 22 are sectional views taken on lines 21 21 and 22 22 of Fig. 19. Figs. 23, 24, 25, and 26 represent different forms of chaser-cutters in cross-section. Fig.

27 represents a modified form of chaser-cutter in side elevation. Fig. 28 represents the same in bottom plan with a dotted line illustrative of the work. Fig. 29 is a view similar to Fig. 28, the form of the chaser-cutter being somewhat modified; and Fig. 30 represents in cross-section a chaser-cutter such as shown in Fig. 29. Fig. 31 is a face view of the die, partly broken away, together with a cross-section of a lathe-bed, showing an attachment thereon for coöperation with the opening and closing devices of the die.

The general construction of the die is quite similar to that shown in my patent above referred to and comprises a tubular main holder $a$, designed for application to an appropriate part of a machine, as the spindle of a lathe or the turret thereof, a die-body or cutter-support $b$, having radial slideways $b^3$, which accommodate the chaser-cutters $e$, an oscillatory or vibratory cam $f$, engaging said chaser-cutters, so as to move the same in and out by its oscillations, and a cam-holder $g$, which is practically part of the cam, being in the form of a surrounding sleeve, fastened thereto by screws $f'$ and embracing the die-body and a flange $a'$ on the front end of the holder $a$. This flange is formed with an encircling groove to accommodate a packing ring or washer $g'$, which bears against the inner wall of the cam-holder and effects a closure between the same and the flange to exclude dirt and dust, and said flange is further grooved or recessed to accommodate a spring $h$, which, being connected at one end with the cam-holder and at the other with the main holder, operates to throw the cam to its die-opening position when free to do so. Instead of the shank shown in my former patent as extending through and splined to the tubular holder $a$ I employ a coupling ring or collar $c$ between the main holder and the die-body, said ring being received in a recess of the flange $a'$ and being formed in opposite sides with diametrically opposite notches or sockets $c'$, as clearly shown in Fig. 9, which notches are entered by the flat-sided end portions of studs $d$, fastened in the die-body and the main holder, there being two of these studs in each of said parts. By this construction the main holder and die-body are rotatively connected with provision for relative longitudinal movement, and, moreover, slight play is allowed between the sides of the studs and the sides of the sockets in the ring sufficient to permit a limited universal angular adjustment of the die-body in order to insure a proper alinement with the work. The joints between the ring and the main holder and die-body are closed interiorly by a band $i$, sprung into place and operating to exclude dirt and chips from between said parts. The main holder and the die-body are yieldingly held together by means of screws $b'$ and spiral springs $b^2$.

The means for effecting the automatic opening of the die are something similar to those shown in my former patent in that a cam-piece $m$ is slidingly fitted to a longitudinal recess in the die-body and has a round head $m^2$, occupying a radial slot in the main holder, so that upon relative longitudinal movement between the latter and the die-body the concaved cam-surface $m'$ of said piece $m$ will operate to trip the detent devices. These detent devices in the present instance comprise a sliding bolt $j$ in a radial recess opening out of the sides of the die-body, said bolt being formed at one side with a double inclined shoulder $j^2$, a spiral spring $j'$ behind said bolt, and an adjustable abutment in the form of a stud or pin $k$, entered through a tangential opening in the cam-holder and having a screw-threaded head engaging screw-threads in said opening. The double inclined shoulder $j^2$ projects into the cavity of the cam-piece $m$, and the coaction of the cam-surface $m'$ with said shoulder effects the withdrawal of the bolt $j$ from the path of the pin $k$.

The operation in this particular is practically the same as with the construction shown in my former patent; but an additional device is here employed in the form of a tappet-pin $n$, inserted through a radial opening in the cam-holder and bearing against the end of the bolt. This tappet-pin is properly limited in its movements, and when the die is closed it projects sufficiently from the periphery of the cam-holder to encounter an obstruction which may be purposely thrown in its path—such, for example, as the cam projection $n'$ on horizontally-swinging lever $n^2$, carried by a bracket $n^3$ on the lathe-bed, as shown in Fig. 31. This tappet is utilized when the die rotates, as when mounted on the spindle of a lathe in the manner shown in Fig. 3. Under such circumstances the automatic closing of the die can be effectively accomplished by such an arrangement as shown in Fig. 10, where $o$ designates a lever pivoted at its inner end by means of a stud $o'$ to the rear side of the flange on the main holder and carrying near its outer end a roller $o^2$, occupying a radial slot in the cam-holder. Said lever projects from the latter's periphery and is adapted to encounter an abutment such as that presented by the cam projection $n'$ on the lever $n^2$ (shown in Fig. 31) when said lever is properly adjusted for the purpose, so that under rotation of the die in the direction indicated by the arrow in Fig. 10 the coaction of said lever with the abutment produces a relative rotary movement between the cam-holder and the main holder, resulting in closing the die. Means for accomplishing this where the die does not rotate, but is mounted on a turret $t$, as shown in Fig. 13, are necessarily somewhat different. Here the die need simply be equipped with a roller $p$, carried upon the rear side of the cam-holder, and the turret-bed carries an upstanding cam-strip $r$, with a concaved or upwardly-inclined top edge for the roller to encounter, whereby, assuming the turret to be moving in the direction of the arrow $y$ in Fig. 14, the cam ring or holder will be caused to turn in the direction of the arrow $z$ and the die will be closed.

Proceeding next to a description of the peculiarities in the chaser-cutters, whereby a limited number of their teeth have a cutting engagement with the work, while the others merely engage the work as a controlling-nut, it may be said that perhaps the simplest way here shown for accomplishing this result is that illustrated in Figs. 18 to 22, where the chaser-cutter 4 is set obliquely to the axis of the work $b''$ with the edges of its teeth in a plane tangential to the latter; but the essential requirement here is that the front side 2 of the chaser-cutter have such obliquity that the points $a''$ of the teeth will be removed from cutting engagement with the work in the back part of the cutter, as clearly illustrated in Fig. 22, and it is manifestly immaterial to this end whether the opposite side 3 of the cutter is correspondingly oblique or not. The edges 5 of the teeth need not lie in a plane at right angles to the front face of the cutter, as shown in Figs. 18 to 22, but may lie in a plane at an acute angle thereto, as shown at $a^{12}$ in Fig. 23, or may be concave, as shown at $a^{13}$ in Fig. 24, or convex, as shown at $a^{14}$ in Fig. 25, or may extend partially in a plane at right angles to the front side of the cutter and then curve downward, as at $a^{15}$ in Fig. 26.

The desired relation of the points of the teeth to the axis of the work may be attained without necessitating the oblique disposition of the cutter itself, but by removing some of the metal from the front side of the cutter, as shown at 6 in Figs. 27 to 30, so as to have the points of the teeth in a line oblique to the axis of the die and in a plane at right angles to an axial plane of the work.

With any of the forms of cutter shown the edges of the teeth may extend across the end face of the cutter-body in lines at right angles to an oblique line embracing the front ends or points of the teeth, which is an advantage in itself over former constructions.

I am aware that a tangentially-arranged cutter is shown in a prior patent with a front face oblique to the axis of the work, and I make no claim, therefore, to such a construction or arrangement in a tangential cutter.

I claim—

1. In a screw-cutting die, a radially-disposed chaser-cutter having teeth in its inner end face and a surface at the cutting side in a plane oblique to the axis of the die, whereby the front ends or points of teeth at one part of the cutter are removed from contact with the work, while those of another part of the cutter are in cutting engagement with the work, substantially as and for the purpose specified.

2. In a screw-cutting die, a radially-disposed chaser-cutter having an inner end face tapering in width and formed with teeth which extend across it and correspondingly vary in length, whereby the line of contact between the edges of the teeth and the work may depart from a line embracing the front ends or points of the teeth, substantially as and for the purpose specified.

3. In a screw-cutting die, a radially-disposed chaser-cutter having teeth in its inner end face and having its forward side cut away so that the line of contact between the edges of the teeth and the work may depart from a line embracing the front ends or points of the teeth, substantially as and for the purpose specified.

4. In a screw-cutting die, a radially-disposed chaser-cutter having teeth extending across its inner end face, the front ends or points of such teeth lying in a plane at right angles to an axial plane of the die and embraced in a line of said plane which extends obliquely to the axis of the die whereby the points of a limited number of such teeth have cutting contact with the work, the edges of the other teeth contacting with the latter back of their points, substantially as and for the purpose specified.

5. In a screw-cutting die, the combination of a main holder, a die-body or cutter-holder, and an interposed coupling-ring, said parts having interlocking formations or means rotatively connecting them with provision for relative longitudinal movement, substantially as and for the purpose specified.

6. In a screw-cutting die, the combination with a main holder, and a die-body or cutter-holder, one longitudinally-movable relative to the other, of an interposed coupling-ring with diametrically opposite notches in each side, the main holder having projections engaging the notches in one side, and the die-body or cutter-holder having projections engaging the notches in the other side, substantially as and for the purpose set forth.

7. In a screw-cutting die, the combination of a body portion, radially-movable chaser-cutters therein, an oscillatory cam engaged with said cutter and adapted by its oscillations to move the same in and out, a spring applied to said cam to press it in one direction, the die-body and the cam having abutments to resist the action of the said spring, and one abutment being movable to disengage it from the other, and a radially-movable tappet-piece engaged with said movable abutment and normally projecting from the periphery of the die and adapted to be automatically operated under rotation of the die to disengage the abutments and permit the spring to throw the die open, substantially as described.

8. In a screw-cutting die, the combination of a body portion, radially-movable chaser-cutters therein, an oscillatory cam engaged with said cutters and adapted by its oscillations to move the same in and out, a spring applied to said cam to press it in one direction, a spring-projected sliding abutment carried by the body portion and adapted to be encountered by a fixed abutment on the cam whereby the latter is held in opposition to the spring, and a tappet-piece fitted to slide radially in the cam and normally projecting from the periphery thereof and adapted to be automatically operated under rotation of the die, substantially as and for the purpose set forth.

9. In a screw-cutting die, the combination with a main holder and a die-body rotatively coupled together with provision for relative longitudinal movement, radial chaser-cutters movably mounted in the said body, an oscillatory spring-actuated cam engaged with said chaser-cutters and adapted by its oscillations to move the same in and out, said cam having a radial abutment, a radially-movable abutment carried by the die-body and having a cam-shoulder, a spring behind said movable abutment, and exerting itself to project the same into the path of the abutment on the cam, and a cam-piece engaged with the main holder and held from longitudinal movement with relation thereto, and slidingly engaged with the die-holder and coacting with the shoulder of the movable abutment to retract the latter under relative longitudinal movement between the die-body and holder, substantially as specified.

10. In a screw-cutting die, the combination with a main holder and die-body rotatively coupled together with provision for relative longitudinal movement, radial chaser-cutters movably mounted in said body, an oscillatory spring-actuated cam engaged with said chaser-cutters and adapted by its oscillation to move the same in and out, said cam having a radial abutment, a radially-movable abutment carried by the die-body and having a cam-shoulder, a spring behind said movable abutment, and exerting itself to project the same into the path of the abutment on the cam, a cam-piece engaged with the main holder and held from longitudinal movement with relation thereto and slidingly engaged with the die-holder, and coacting with the shoulder of the movable abutment to retract the latter under relative longitudinal movement between the die-body and holder, and a tappet-piece carried by the cam and projecting therefrom for coaction with a suitable abutment under rotation of the die, said tappet engaging the movable abutment of the die-body, substantially as and for the purpose specified.

11. In a screw-thread-cutting machine, the combination of a die-body, radially-movable chaser-cutters therein, a spring-actuated oscillatory cam engaged with said chaser-cutters and adapted by its oscillations to move the latter in and out, detent mechanism for holding the cam in closing position, means for tripping said detent mechanism, and means for automatically restoring the cam to closing position, said means comprising a roller projection on the cam and an inclined abutment for the roller to encounter under bodily movement of the die whereby partial rotation of the cam may result in a direction corresponding with that in which the die is bodily moving, substantially as described.

12. In a screw-thread-cutting machine, the combination of a die-body, radially-movable chaser-cutters therein, a spring-actuated oscillatory cam engaged with said chaser-cutters and adapted by its oscillation to move the latter in and out, detent mechanism for holding the cam in closing position, means for tripping said detent mechanism, and means for automatically restoring the cam to closed position, said means comprising a lever pivoted to the die-body and engaged with the cam, and an abutment for said lever to encounter under rotation of the die.

13. In a screw-thread-cutting machine, the combination with a die-body, radially-movable cutter-chasers therein, a spring-actuated oscillatory cam engaged with said chaser-cutters and adapted by its oscillation to move the latter in and out, detent mechanism for holding the cam in closing position, means for tripping said detent mechanism, and means for automatically restoring the cam to closed position, said means comprising a lever pivoted to the die-body and engaged with a cam, an abutment for said lever to encounter under rotation of the die, a roller on the cam, and a camway for said roller to encounter under bodily movement of the die, substantially as described.

In testimony whereof I affix my signature in presence of two witnesses.

JAMES HARTNESS.

Witnesses:
JOHN A. HARTNESS,
J. W. BENNETT.